UNITED STATES PATENT OFFICE.

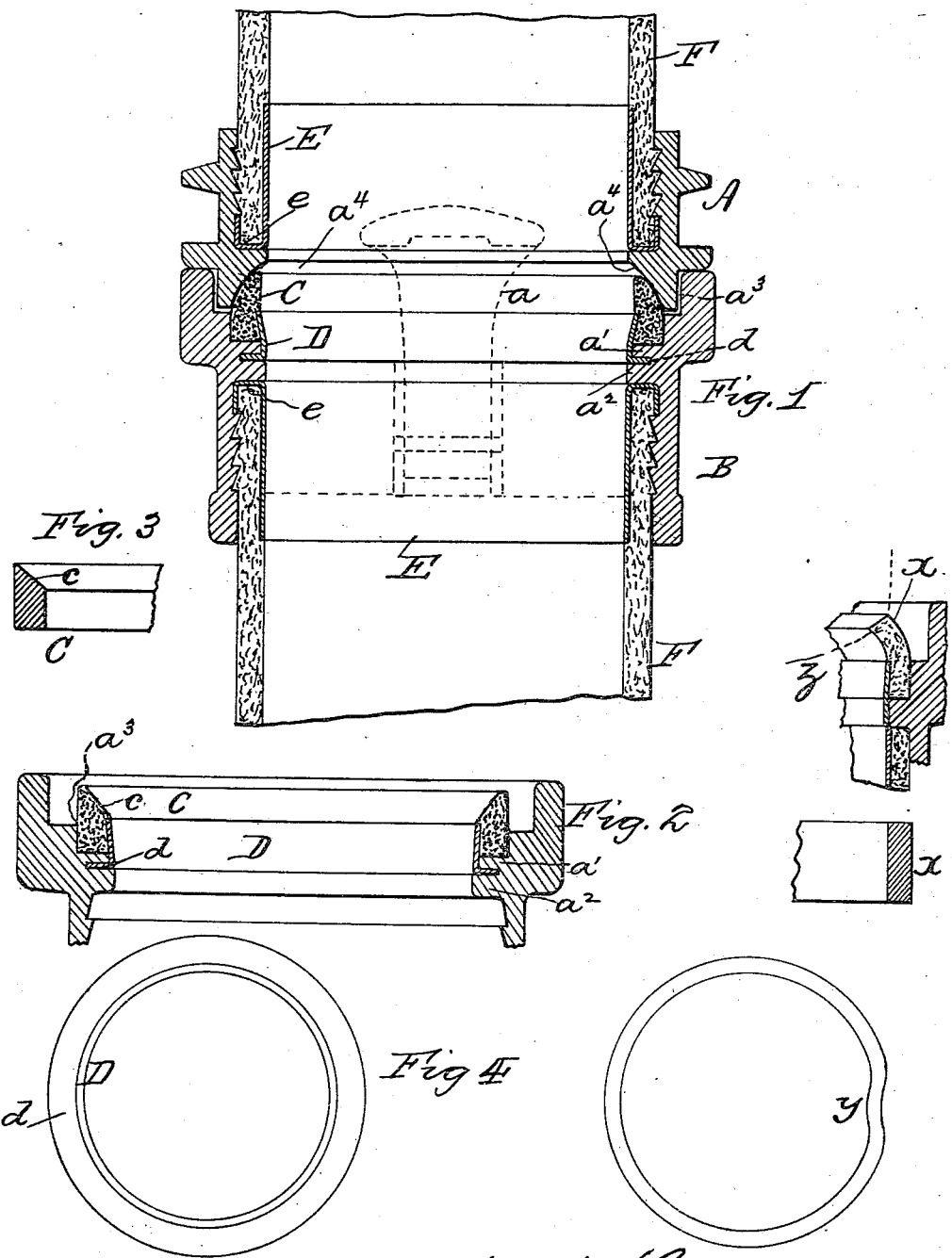

JOHN H. CLAY AND CLEMENS CLAY, OF PHILADELPHIA, PENNSYLVANIA.

HOSE-COUPLER.

SPECIFICATION forming part of Letters Patent No. 259,369, dated June 13, 1882.

Application filed January 25, 1882. (No model.)

*To all whom it may concern:*

Be it known that we, JOHN H. CLAY and CLEMENS CLAY, citizens of the United States, residents of the city and county of Philadelphia, in the State of Pennsylvania, have invented certain new and useful Improvements in Hose-Couplers, of which the following is a specification, reference being had to the accompanying drawings, wherein—

Figure 1 is a transverse vertical section of a coupler embodying our improvements. Fig. 2 is a broken section of the female coupling. Fig. 3 is a similar view of the rubber or packing ring, and Fig. 4 is a detail plan.

Our invention has relation to hose or pipe couplers, and has for its object to improve the construction of the coupler shown in Patent No. 32,135, granted to A. C. Jones, dated April 23, 1861.

Our invention accordingly consists of the peculiar construction, combination, and arrangement of parts having reference to the following points: first, to so construct the coupler that its internal diameter will be equal to or greater than the internal diameter of the attached hose, or, in other words, to so arrange the parts of said coupler that the passage-way through it will be of the same or greater area than that of the hose connected thereto, such result being accomplished without increasing the external diameter of the coupler; second, to the provision of a metal seamless flanged ring for holding the rubber or packing ring, said metal ring being secured to the female coupling in the act of casting the latter; and, third, to the provision of a capped or double-flange ring adapted and designed to secure the hose-sections to the couplings, and which also serves as a cover or water-protector for the ends or edges of such hose resting within the couplings.

Referring to the accompanying drawings, A and B represent respectively the male and female couplings of a Jones coupler provided with the usual connecting dogs or levers, $a$. C represents the packing-ring, and D a metal ring or holder therefor. Said packing or rubber ring, as heretofore used, consisted of a piece of rubber tube or an annular ring the walls or sides whereof have been made of an equal thickness throughout in cross-section, as plainly shown at $x$ in the drawings. Such rubber ring, being placed in the female coupling, was held in position by a strip of sheet metal bent to form a ring, the ends of which overlapped and formed a seam. Such ring was then "brazed" to the coupling and expanded, whereupon its upper edge became embedded in said rubber or packing ring, and thereby held the latter in the coupling. Such construction and mode of operation are tedious and more or less expensive. Besides, the seam in the metal ring, when expanded, caused the upper edge of the rubber or expanding ring adjacent thereto to bend or project inwardly to a greater extent than the remaining part thereof. Hence the upper edge of said rubber or packing ring, instead of being a true circle in outline, was irregular in configuration, as shown at $y$, and caused an imperfect joint to be produced when the couplings were joined together. Again, the walls or sides of such rubber or packing ring being parallel throughout in cross-section, the expanding of the brazed metal ring caused the inner upper edge of said packing-ring to turn over and project into the passage-way of the coupling, as plainly seen at $z$, or in the aforementioned patent of Jones. Such projecting corner of said ring decreased the internal area or diameter of the coupling. In many cases such reduction often amounted from a quarter to three-eighths of an inch, the result whereof was that water forced or passed through the hose-sections attached to such couplers met with unnecessary friction or resistance. In a long line of hose such resistance became very great, to overcome which required additional power or force. Such friction or resistance may be obviated and such additional power saved by so arranging the rubber or packing ring that it will not project into the passage-way of the coupler. Such result we accomplish by means of the following-described construction and arrangement, and which constitutes our invention.

The metal holding or expansion ring D consists of an endless band without seams, and is so formed by being stamped or otherwise produced from a plate of sheet metal. It is provided with a flange, $d$, as shown. Said ring, instead of being brazed to the female coupling, is first placed in the core for the latter, and both said ring and core are then placed within the mold wherein the coupling is to be cast, so that the molten metal will flow around both above and below flange $d$, as shown at $a'$ $a^2$, and thereby firmly hold said ring in position within the coupling. Hence when the latter is removed from the mold the ring D is already in position to receive the rubber or packing ring C. The latter is beveled off at $c$, as shown in Fig. 3, or, in other words, its upper inner corner is cut off to form said bevel $c$. Said ring being laid in the annular recess $a^3$ of the coupling, an expansion-tool is then inserted within ring D to cause its upper edge to become embedded in the rubber or packing ring C, as illustrated in Figs. 1 and 2. When the couplings are joined together the beveled edge $a^4$ of the male coupling A engages with or impinges against the packing-ring C, causing the latter to contract until it is nearly or quite flush with the diameter of the coupling, as shown in Fig. 1. It will thus be seen that said packing-ring does not at any time project into the passage-way of the coupler. Consequently such passage-way remains the same as that of the hose, or, in other words, the internal area of the coupler and the hose are the same. Therefore water will pass through said parts without meeting any undue friction or resistance. It will also be noticed that such equality of the inner areas of the coupler and the hose is obtained without altering or enlarging the external dimensions of the couplings. Hence our improved packing-ring may be inserted in the couplers already in use by simply removing the old packing-rings and replacing them with the beveled rings C.

E is a ring designed to be secured to the ends of the hose-sections F to provide means for fastening said sections to the couplings. The ring E is formed with a cap or double flange, $e$, adapted and designed to pass around the edges or ends of the hose-sections, as shown in Fig. 1. Such caps $e$ prevent the water passing through the coupler coming into contact with said hose ends or edges, and thereby preserve the same from rotting. Hence such hose-connections so provided with the capped rings E are more durable than those connected as has heretofore been the custom.

What we claim as our invention is—

1. In combination with the couplings A and B, the ring D, flanged at $d$, and a rubber or packing ring, C, beveled at $c$, substantially as and for the purpose set forth.

2. In combination with the coupling-section B and packing or rubber ring C, constructed substantially as shown and described, the seamless flanged sheet-metal ring D, formed separate from said coupling-section, substantially as set forth.

3. In combination with the coupling-sections A and B, the rubber or packing ring C, beveled at $c$, and means, substantially as set forth, for securing said ring in position within the section B, substantially as and for the purpose set forth.

4. In combination with the coupling-sections A and B, constructed substantially as shown and described, a packing or rubber ring, C, beveled at $c$, and arranged within the section B in such manner that the area of the passage-way through the coupling-sections will be equal to or greater than that through the attached hose, substantially as shown and described.

5. In combination with the coupling-sections A and B, the ring D, flanged at $d$, rubber or packing ring C, beveled at $c$, and ring E, capped at $e$, substantially as shown and described.

In testimony that we claim the foregoing we have hereto set our hands this 21st day of January, A. D. 1882.

JOHN H. CLAY.
CLEMENS CLAY.

Witnesses:
CHAS. F. VAN HORN,
JAMES MARTIN.